United States Patent Office 3,551,396
Patented Dec. 29, 1970

3,551,396
CONTINUOUS VINYL POLYMERIZATION
PROCESS
Raymond Lanthier, Pierrefonds, Quebec, Canada, assignor to Gulf Oil Canada Limited, Toronto, Ontario, Canada
No Drawing. Filed Dec. 24, 1968, Ser. No. 786,767
Claims priority, application Canada, Jan. 5, 1968, 009,241
Int. Cl. C08f 1/06, 1/60, 1/62
U.S. Cl. 260—85.7  13 Claims

ABSTRACT OF THE DISCLOSURE

A polymerizing charge of vinyl monomer in a liquid medium in which the resulting polymer is insoluble is circulated repeatedly through a circulating pump and substantially closed "loop" reactor to which additional monomer, liquid medium, and polymerization initiator are continuously added and from which liquid medium containing solid polymer are continuously withdrawn at the same rate; the polymerization initiator decomposes substantially quantitatively to liberate free radicals in the time required for it to circulate through the reactor once, and liberates sufficient free radicals to initiate polymerization of the simultaneously added monomer to a desired degree of conversion. The liquid medium can be an aqueous medium, in which vinyl monomers generally are immiscible and vinyl polymers insoluble, or an organic liquid medium in which the resultant polymer is insoluble (and in which the vinyl monomers generally are miscible), or it can be merely an excess of the vinyl monomer to be polymerized in cases where the resulting polymer is insoluble in such monomer. Products are dispersions of polymer in liquid medium, which may be stable, e.g. stable aqueous emulsions of polymers, or dispersions from which solid polymer is readily separated and recovered from the liquid medium.

---

This invention relates to a polymerization process and more particularly to a continuous process for polymerization of one or more vinyl monomers, especially in aqueous suspension but including also polymerization in any liquid medium in which the resulting polymer is insoluble.

Polymerization of vinyl monomer in aqueous suspension, either to form stable aqueous emulsions of polymer or polymer in discrete particle form readily separable as solid from the aqueous suspending medium, is an old and much practised art. Substantial if not major proportions of vinyl polymers currently being manufactured commercially are polymers made in aqueous suspension. Furthermore it is well known that numerous advantages are obtained by a process operating in a continuous manner in contrast to a corresponding process operating batchwise. Hence numerous attempts have been made to devise continuous processes for polymerization in aqueous suspension, but the attempts heretofore have achieved only limited degrees of success.

It is a principal object of this invention to provide a continuous process for polymerization of vinyl monomers, especially in aqueous media, in which process vinyl polymerization is carried out rapidly and uniformly to provide uniform products at high rates of production. This and other objects of the invention will be more apparent from the following description and examples of the invention.

Fundamental to the operation of a continuous vinyl polymerization process is the provision of a polymerization initiator system (sometimes loosely referred to as polymerization catalyst) which sustains polymerization of vinyl monomer until monomer is converted to polymer to a desired degree of conversion, and at the same time promotes polymerization at a rate which is rapid enough to complete the desired polymerization in a reasonably brief period, i.e. less than one hour or so, but not so rapid as to risk loss of temperature control with consequent runaway exothermic reaction. Most of the common vinyl polymerization initiators or initiator systems are free-radical producers and the most common of these are classified generally as either a "per" compound type or a redox type. The "per" compound type includes for example peroxides, hydroperoxides, and azo compounds; these decompose in solution either by heat or photochemically to form free radicals at a characteristic rate. Redox type initiator systems involve the use of at least two ingredients including an oxidant and a reductant or activator which interact on mixing to produce free radicals at characteristic temperature dependent rates; a particular feature of redox initiated vinyl polymerizations is that the activation energy of polymerization is considerably less than that required with other types of free radical forming initiators.

However, numerous redox polymerization initiator systems have been found to produce free radicals at such high rates at the temperatures desired for polymerizations that before sufficient polymerization could be initiated and completed by such systems the free radicals have been lost inside reactions or decompositions of the radicals.

It has now been found that "per" compound and redox polymerization initiator systems that produce free radicals at high rates, including particularly rates which have heretofore precluded use of the systems in continuous polymerization reactions, can be used in continuous polymerization by a combination with a continuously circulating polymerizing charge to which the ingredients necessary for the polymerization are continuously fed and from which polymerization product is continuously withdrawn.

The invention thus consists of a continuous process for the polymerization of polymerizable vinyl monomer in liquid medium in which the resulting polymer is insoluble which process comprises:

(a) continuously repeatedly circulating a charge of a polymerizing vinyl monomer, in liquid medium in which the resultant polymer is insoluble, through a circulating pump and an elongated reactor,
(b) continuously adding to the charge as ingredients thereof
   (i) vinyl monomer in the liquid phase,
   (ii) liquid medium in which the vinyl monomer is to be polymerized, and
   (iii) a polymerization initiator system which, at the temperature in the reactor and within the time required for the charge to circulate once through the reactor, decomposes substantially quantitatively and forms at least a polymerization initiating quantity of free radicals,
(c) maintaining the circulating charge in a suitable polymerization temperature range, and
(d) continuously withdrawing part of the circulating charge from the reactor at a rate equal to the rate of addition of ingredients, the rate of circulating the charge and the rates of addition of the monomer to be polymerized and the liquid medium being proportioned to achieve a desired degree of conversion of the monomer to polymer.

In carrying out the process of the present invention it is a particular advantage of the process that it is possible and convenient to use simple conventional equipment, thereby minimizing capital costs for the polymerization apparatus. The process involves first a continuous repeated circulation of a polymerizing charge through an elongated reactor; the elongated reactor is most conveniently in the form of a simple tube or pipe, which form provides greater surface to volume ratio than conventional polymerization kettles, is easier to fabricate and accordingly less expensive, and furthermore is far simpler to fabricate for operation under high pressures. The pump required to circulate the charge through the elongated reactor can conveniently be a centrifugal pump of conventional design, or it can be some type of positive displacement pump which can provide continuous and desirably rapid circulation of the polymerizing charge, particularly for more viscous charges.

The process of the invention secondly involves continuously feeding liquid monomer and the other raw material ingredients of the charge, including the ingredients of the initiator system, to the rapidly circulating charge. The continuous feeding of the ingredients to the circulating charge, for example at the inlet of the circulating pump, is a conventional simple operation requiring only the precaution that the initiator system, e.g. the oxidant and the reductant, be kept inactive until mixed with the monomer to be polymerized at polymerization temperature. This precaution is necessary because many of the redox initiator systems which are advantageously used in the process of this invention react completely to form free radicals so rapidly that, before the free radicals can be mixed with monomer to be polymerized, they are lost in side reactions or decomposition unless, for example, the oxidant and reductant of the initiator system are mixed simultaneously with each other and with the vinyl monomer to be polymerized. The precaution is easily taken in the process of the present invention by having the separate ingredients of a redox initiator system dissolved in separate solutions which are added continuously to the circulating charge. Thus for example one ingredient can be dissolved in monomer being continuously added to the charge while the other is dissolved in aqueous or other liquid medium being continuously added to the charge; alternatively each ingredient can be disolved in a separate stream of monomer or of aqueous or other liquid medium, with each stream being added continuously to the charge.

It is a critical feature of this invention that the initiator system form free radicals in quantity sufficient to initiate polymerization within the time required for the circulating charge to circulate once through the reactor; by this feature the proces ensures that there does not develop an accumulation of both monomer and polymerization initiator in the charge which could eventually initiate and polymerize the accumulated monomer in an uncontrolled manner.

It is well known in the art that various monomers are frequently preferably polymerized at certain preferred temperatures and that various "per" compound and redox initiator systems are preferably used in particular temperature ranges to initiate polymerization. The present invention permits ready utilization of these preferences when the circulating charge is maintained in the desired polymerization temperature range, as an elongated reactor is most readily arranged to achieve any necessary heat exchange and maintain a uniform temperature for the polymerization.

Withdrawal of part of the circulating charge at a continuous rate equal to the rate of continuous addition of ingredients to the charge maintains a uniform quantity of material in the circulating charge and is easily achieved, e.g. by a simple overflow line permitting part of the charge to flow out of the reactor at a point near where circulating charge returns to the inlet of the circulating pump. By withdrawing the charge from such location, any withdrawn material will have been circulating in the reactor for a time which has permited circulation for at least the largest part of one cycle through the pump and reactor; with the limitation that the initiator system forms a polymerizing initiating quantity of free radicals within the time required for one complete cycle through the reactor, it is apparent that most of the initiator added to the reactor will have initiated substantially all the polymerization that it can initiate before it can leave the reactor with withdrawn materials.

It is obvious that, in continuous aqueous suspension polymerizations, the ratio of the rates of addition of monomer and aqueous suspending medium to the reactor is selected and adjusted to provide desired suitable proportions of polymer and aqueous suspending medium in the material withdrawn from the reactor. Likewise it is obvious that in continuous polymerizations in organic liquid media in which the monomers to be polymerized in accordance with the invention are completely miscible, the ratio of the rates of addition of monomer to be polymerized and other liquid medium is likewise selected and adusted to provide suitable proportions of polymer and liquid suspending medium so that the circulating charge remains fluid and can be pumped through and flow adequately from the reactor; where the liquid medium is the same substance as the monomer being polymerized, it is obvious that much of the monomer must pass through the reactor unconverted.

The rate of circulation of the charge in the reactor can be varied widely in accordance with the invention. Most commonly in aqueous suspension vinyl polmerizations it is desired to achieve substantially complete conversion of vinyl monomer to polymer. Such conversion can readily be achieved in the process of the present invention by repeatedly circulating the charge in the reactor by means of the circulating pump at a rate much greater than the rates of addition of the ingredients to the reactor, whereby the material in the polymerizing charge circulates many times through the reactor, on the average, before being withdrawn therefrom. When a degree of conversion of monomer to polymer substantially less than complete is desired, it also can be achieved, in the process of this invention, by repeatedly circulating the charge in the reactor at a rate which achieves on the average a restricted number of cycles of circulation of the polymerizing material through the reactor before the material is withdrawn therefrom. For substantially complete conversion of monomer, which most commonly is desired in suspension polymerizations, a ratio of rate of circulation of the charge to rate of addition of ingredients to the charge which is of the order of 100:1 is generally more than adequate; the ratio is conventionally referred to as the circulation ratio. A circulation ratio of 60:1 has been found to be adequate to achieve substantially complete conversion of vinyl acetate monomer to polymer, in the process of this invention, as also has a circulation ratio of 40:1. Ratios of the order of 25:1 and lower generally achieve degrees of conversion of monomer to polymer which are less than complete conversion. Other factors which also will have some effect on the degree of conversion of monomer to polymer are well known in the art; they include, for example, temperature, time of polymerization, activity of the initiator system, and inherent tendency of the vinyl monomer to polymerize and/or copolymerize.

It must also be pointed out that the process of the invention is applicable to vinyl copolymerizations as well as to vinyl homopolymerizations. Furthermore, where a copolymerization of a readily reactive vinyl monomer with a much less reactive monomer is desired, for example copolymerization of vinyl acetate with ethylene, which is a less reactive monomer than vinyl acetate in copolymerization, a copolymer of desired composition can be obtained by copolymerizing the reactive monomer to substantially complete conversion in presence of less reactive monomer in some proportion greater than that required to give the desired copolymer composition, the less reactive monomer being copolymerized to a degree of conversion less than complete. Therefore throughout the present specification and claims the term "polymerization" is to be construed as including copolymerization unless the context requires copolymerization to be excluded.

Regardless of the degree of conversion of vinyl monomer to polymer which it may be desired to achieve, experimental data indicate generally, regarding the rates of circulation of the charge through the reactor and the rates of addition of monomer and liquid medium to the reactor, that the rate of circulating the charge preferably should be a multiple of at least ten times the rates of addition of the monomer and liquid polymerization medium; for achieving substantially complete conversion of vinyl monomer to polymer by the process of the invention it is essential to have the circulation ratio over 25 and more preferably 40 or higher, with the rates of addition of monomer and liquid medium to the reactor being proportioned to provide the desired ratio of polymer to dispersing medium in the withdrawn product and to expel polymerizing charge containing less than 5% of residual vinyl monomer.

It can also be pointed out that the process of the invention as applied to aqueous suspension polymerization includes the numerous modifications of aqueous suspension vinyl polymerization which are already well known in the art. Thus for example various wetting and dispersing agents can be optionally included in the aqueous suspending medium to assist in the dispersion of vinyl monomer therein, buffering agents can be included to maintain a preferred pH range for optimum polymerization initiator activity, and stabilizers and plasticizers can be included to improve stability and other properties of the products. The proportions of such optional ingredients used in the process of this invention can be selected in accordance with the principles already known in the art.

It can further be pointed out that proportions of redox polymerizations initiator used in the process of this invention can be selected from the range of proportions of redox polymerization initiators usually used in the art of vinyl monomer polymerizations; furthermore, it has been found that proportions of redox polymerization initiator which are far lower than have usually been used, in vinyl monomer polymerizations, also can be used to achieve successful and complete polymerizations by the process of the present invention. The possibility of using far lower proportions of polymerization initiator than have previously been required is of advantage in reducing the cost of materials required for polymerization and also in reducing the possibility of undesirable initiator residues remaining in the product; such residues are thought, for example, to be responsible for undesired post-polymerization cross-linking occurring in some polymer products.

Redox polymerization initiator systems which, within the time required for a polymerizing charge to circulate rapidly once through an elongated reactor, can decompose substantially quantitatively and form at least polymerization initiating quantities of free radicals include, for example, the combinations of tert.-butyl hydroperoxide and sodium bisulfite or metabisulfite, 1,1,3,3-tetramethyl butyl hydroperoxide and sodium bisulfite or metabisulfite, potassium persulfate and sodium bisulfite or metabisulfite, cumene hydroperoxide and ferrous sulfate, and potassium permanganate and sodium bisulfite or metabisulfite, all of which systems form free radicals at extremely rapid rates. Other redox initiator systems also are known which form free radicals reasonably rapidly, for example the combination of cumene hydroperoxide and sodium bisulfite or metabisulfite, but their rates of formation of free radicals are such that the rate of production of polymer, in any given continuous polymerization reactor using the process of the present invention, is considerably limited compared to that which can be obtained with the redox systems previously listed above. "Per" compound type of free radical producing polymerization initiators which, within a temperature range appropriate for polymerization, produce a polymerization initiating quantity of free radicals rapidly enough to be suitable for the process of this invention include, for example, acetyl cyclohexane sulfonyl peroxide (ACSP), and di(alkyl) peroxydicarbonates, tertiary butyl peroxypivalate, and diisobutyl peroxide.

The invention can conveniently be illustrated by the following examples of specific embodiments thereof. Throughout the examples and elsewhere in this specification the percentages given are expressed as percentages by weight unless otherwise indicated.

EXAMPLE 1

A laboratory scale polymerization reactor was set up to carry out a series of continuous polymerizations in accordance with the process of the invention. For this example the major components of the apparatus were a centrifugal pump and a length of about 13 feet (4 meters) of one-half inch (1 cm.) nominal outside diameter aluminium tubing connected to the inlet and outlet of the pump to form a substantially closed loop; a T joint in the loop near the connection to the inlet of the pump permitted material to flow from the loop to an overflow vessel for product recovery as additional material was fed to the inlet of the centrifugal pump. For convenience of cooling, a portion of the length of the tubing was bent into a coil which was immersed in a water bath; the liquid holding capacity of the pump and tubing was about 800 ml. Two feed reservoirs were connected through appropriate tubing, control valves, and flow meters to the inlet of the centrifugal pump. The pump itself had a stainless steel casing and a polypropylene covered impellor driven by a $\frac{1}{35}$ H.P. motor through a magnetic drive; by measurement it was determined that it could pump 1.5 imperial gallons/min. (6.82 l./min.) of emulsion product of this example under operating conditions of the example. Thermocouples were used to measure the temperature of the cooling water bath and the material in the loop. The pump and loop were first filled to capacity (800 ml.) with a polyvinyl acetate homopolymer emulsion similar to that to be produced and the pump started and operated at full speed to ensure rapid recirculation of the emulsion through the loop. Addition of feed solutions from the two reservoirs at ambient room temperature was then started at continuous uniform rates, the feeds going into the pump inlet and loop and forcing an equivalent amount of emulsion out of the loop through the T joint into the overflow vessel. The two feed solutions and their rates of flow to the pump inlet were as follows:

(1) A vinyl acetate solution containing 0.4% by weight tert.-butyl hydroperoxide and 1.83% by weight each of a polyoxyethylene - polyoxypropylene coplymer of molecular weight about 1950 containing about 10 weight percent polyoxyethylene groups, sold under the name Pluronic L61 (trademark) and a polyoxyethylone-polyoxypropylene copolymer of molecular weight about 8750 containing about 80 weight percent polyoxyethylene groups sold under the name Pluronic F68 (trademark), the balance of the solution (95.54%) being vinyl acetate; this solution was fed to the circulating pump at a rate of 62 ml. per minute.

(2) An aqueous solution containing 0.53% by weight each of sodium bisulfite and disodium hydrogen phosphate, balance water; this solution was fed to the circulating pump at a rate of 50 ml. per minute.

When feed of the foregoing solution was started, polymerization of the monomer added to the loop began and the temperature of the emulsion in the loop started to rise; within 10 minutes it had increased from ambient room temperature to 40° C. and was thereafter maintained at the 40° C. level by circulation of water in the cooling bath. Addition of feed solutions, recirculation of emulsion in the loop, and withdrawal of emulsion from the overflow vessel was continued for two hours. During this period the ratio of the rate of circulation of polymerizing mixture in the loop to the total feed rate was about 60:1, based on the measured pumping capacity of the circulating pump. The average residence time or hold-up time of material in the loop, calculated from the measured capacity of the loop and the combined feed rates of the raw material ingredients of the emulsion, was about 7 minutes. Product emulsion withdrawn from the loop was periodically sampled and properties of the emulsion product under steady state conditions of reactant feed, polymerization, and product withdrawal were determined by analysis, after an appropriate interval, to be as follows: solids content—51.6% by weight of emulsion, PH—6.5, viscosity—0.28 poise as measured at 24° C. with a Brookfield viscometer using No. 1 spindle at 20 r.p.m., average particle size—0.30 micron, residual monomer content at time of withdrawal from the loop —1.60%. From the value of the residual monomer content at time of withdrawal of emulsion from the loop, the monomer conversion was calculated to be 97% in the loop. On allowing the emulsion product produced and accumulated over the two hour continuous operation to stand at ambient room temperature for a further 16 hours, its residual monomer content dropped to 0.17%, indicating that polymerization continued to substantially complete conversion of the monomer after withdrawal of the emulsion from the loop. This final emulsion product was a smooth, creamy, stable vinyl acetate homopolymer emulsion of a type produced as a stand commercial product useful for example, for vinyl latex paint bases.

EXAMPLE 2

The procedure of Example 1 was repeated, the polymerization temperature being maintained at 40° C. but the feed rates of the vinyl acetate monomer solution and the aqueous solution being increased to 93 ml./min. and 75 ml./min. respectively; at these rates of feed the ratio of recirculation rate to total feed rate was about 40:1 and the average residence time was 4.6 minutes. The product emulsion withdrawn from the reactor under these conditions was a stable emulsion substantially the same as that produced in Example 1; its residual monomer content at time of withdrawal of the product from the loop was 1.90% by weight of the emulsion; thus the increased feed rates and significantly decreased residence time had not significantly affected the degree of monomer conversion nor adversely affected the quality of the product.

EXAMPLE 3

This example was carried out in the apparatus described in Example 1 but with the length of tubing forming the loop shortened to about 10 feet (3.05 meters), which reduced the reactor volume (pump and tubing liquid capacity) to 750 ml. The feed solutions for this example consisted of: (1) vinyl acetate monomer (99.6%) containing tert.-butyl hydroperoxide (0.4%) dissolved therein, percentages by weight of the solution, (2) water (98.94%) containing dissolved therein sodium bisulfite (0.53%) and disodium hydrogen phosphate (0.53%), percentages by weight of the solution. The monomer and aqueous solutions were fed to the circulating pump at rates of 30 ml./min. and 24 ml./min. respectively, giving an average residence time of material in the loop of 13.9 minutes. Temperature of the polymerizing mixture in the loop was maintained at 40° C. and polymerization otherwise carried out as described in Example 1. Despite the fact that no emulsifying agent or other surface active material was included among the ingredients of this example, the product was a smooth stable creamy emulsion of polyvinyl acetate homopolymer containing 53.0% total solids by weight of the emulsion; it had a pH of 6.4, a viscosity of 0.28 poise measured as in Example 1, an average particle size of 0.42 micron, and a residual monomer content as it emerged from the reactor of 1.2%. On allowing the accumulated emulsion product to stand at ambient room temperature for a further 16 hours, during which polymerization of the residual monomer continued, the residual monomer content dropped to 0.1% indicating substantially complete conversion of the monomer.

EXAMPLE 4

This example was carried out in the apparatus as described in Example 1 modified by the addition of an overflow vessel in the circuit with the loop through which the polymerization mixture was continuously circulated; addition of this overflow vessel increased the volume of polymerizing mixture being continuously circulated to 1,000 ml. The overflow vessel was fitted with a reflux condenser to permit operation at atmospheric reflux temperature. The procedure for carrying out the polymerization of the present example followed that of Example 1 but with the substitution of sodium metabisulfite for the sodium bisulfite in the redox initiator system used in Example 1. The feed solutions thus consisted of:

(1) Vinyl acetate (95.94%) containing dissolved therein tert.-butyl hydroperoxide (0.4%) and the two previously identified surfactants Pluronic L61 and Pluronic F68 (1.83% of each).

(2) Water (98.8%) containing dissolved therein sodium metabisulfite and disodium hydrogen phosphate (0.6% of each).

The feed rates of the foregoing solutions to the circulating pump were 40 ml./min. and 33 ml./min. respectively; from these feed rates and the volume of the circulating mixture, the average residence time was thus 13.7 minutes. In starting the polymerization with the reactor initially at room temperature, the desired temperature of 40° C. was achieved more rapidly with the sodium metabisulfite in the redox system than with the sodium bisulfite used in Example 1, indicating a greater rate of production of polymerization initiating free radicals.

The product withdrawn from the overflow vessel was a smooth creamy stable polyvinyl acetate emulsion and on analysis after appropriate interval was found to have a total solids content of 53.6%, a pH of 6.7, a viscosity of 0.25 poise measured as in Example 1, an average particle size of 0.5 micron, and a residual monomer content on emerging from the overflow vessel of 3.08% by weight of the emulsion. On allowing the accumulated emulsion to stand for 16 hours, the residual monomer content decreased to 0.12%.

EXAMPLES 5–10

The emulsion homopolymerization of vinyl acetate was carried out in this series of examples using tert.-butyl hydroperoxide and sodium metabisulfite as the initiator system, with the temperature of polymerization varied over the range 25° C. to 70° C. for the various examples. The procedure and apparatus were as described in Example 4; however, at the higher temperatures the water bath, prior to starting the polymerization, was heated to about 10° C. below the desired reactor temperature in order more quickly to reach an equilibrium at the desired temperature. In all cases, the polymerization proceeded smoothly and even at 70° C. there was no evidence of monomer condensation in the condenser attached to the overflow device despite the fact that the system was operated at atmospheric pressure. At 70° C., some foaming began to occur; at temperatures above 70° C. polymerization could not be carried out effectively at atmospheric pressure as foaming and vapor locks interfered with the operation of the centrifugal pump. The nature of these operational difficulties was such that they could have been obviated by a modification of the system to pressure operation. At the various temperatures over the range 25–70° C., smooth stable emulsions were produced on a continuous basis, in each case at an average residence time of 13.7 minutes. Properties of the emulsions are given in Table 1.

TABLE 1

| Ex. No. | Temperature of poly-monomer (°C.) | Product emulsion ||||||
|---|---|---|---|---|---|---|---|
| | | Total solids (percent) | pH | Viscosity (poises) | Average particle size (micron) | Residual monomer (percent by weight of emulsion) ||
| | | | | | | (1) | (2) |
| 5 | 25 | 52.8 | 5.6 | 0.30 | 0.50 | 4.66 | 0.25 |
| 6 | 30 | 52.2 | 6.7 | 0.25 | 0.50 | 2.95 | 0.36 |
| 7 | 50 | 51.9 | 6.7 | 0.20 | 0.42 | 1.57 | 0.03 |
| 8 | 60 | 52.9 | 6.0 | 0.25 | 0.37 | 1.52 | 0.09 |
| 9 | 65 | 52.2 | 6.2 | 0.25 | 0.40 | 3.14 | 0.09 |
| 10 | 70 | 49.6 | 5.2 | 0.25 | 0.37 | 0.82 | 0.01 |

1 Determined on emulsion at outlet of reactor.
2 Determined on emulsion after 16 hours.

EXAMPLES 11–12

Emulsion homopolymerization of vinyl acetate was carried out as described in Example 4. The feed rate of monomer solution was increased to 100 ml./min. and that of the aqueous solution to 83 ml./min.; the average residence time thus was 5.46 minutes in each case. The temperatures of polymerization were maintained at 50° C. and 60° C. respectively. The operation proceeded with no difficulties and the products were smooth stable emulsions having properties as shown in Table 2.

TABLE 2

| Ex. No. | Temperature of poly-monomer (°C.) | Product emulsion ||||||
|---|---|---|---|---|---|---|---|
| | | Total solids (percent) | pH | Viscosity (poises) | Average particle size (micron) | Residual monomer (percent by weight of emulsion) ||
| | | | | | | (1) | (2) |
| 11 | 50 | 53.9 | 6.45 | 0.30 | 0.37 | 3.95 | 0.16 |
| 12 | 60 | 53.0 | 6.5 | 0.25 | 0.37 | 2.23 | 0.09 |

1 Determined on emulsion at outlet of reactor.
2 Determined on emulsion after 16 hours.

Thus, the average residence time for the homopolymerization of vinyl acetate at 50° C. and 60° C. was decreased from 13.7 minutes (Examples 7 and 8) to 5.46 minutes with no adverse effect on operation of the system nor on quality of product.

EXAMPLES 13–14

These examples illustrate the use of the hydroperoxide 1,1,3,3,-tetramethyl butyl hydroperoxide as a redox component in place of tert.-butyl hydroperoxide. The apparatus and procedure of example 4 were used. The composition of the feed solutions was (1) 95.94% vinyl acetate, 1.83% Pluronic L61, 1.83% Pluronic F68 and 0.4% 1,1,3,3-tetramethyl-butyl hydroperoxide (percentages by weight of solution); (2) 98.8% water, 0.60% sodium dihydrogen phosphate, and 0.60% sodium metabisulfite. The monomer solution was added at a rate of 40 ml./min. and the aqueous solution at 33 ml./min., giving an average residence of 13.7 minutes. This procedure was carried out at 40° C. and at 60° C., for Examples 13 and 14 respectively. The resulting stable emulsions had the properties shown in Table 3.

TABLE 3

| Ex. No. | Temperature of poly-monomer (°C.) | Product emulsion ||||||
|---|---|---|---|---|---|---|---|
| | | Total solids (percent) | pH | Viscosity (poises) | Average particle size (micron) | Residual monomer (percent by weight of emulsion) ||
| | | | | | | (1) | (2) |
| 13 | 40 | 52.3 | 3.9 | 0.25 | 0.40 | 3.12 | 0.32 |
| 14 | 60 | 49.0 | 3.65 | 0.20 | 0.33 | 5.35 | 0.9 |

1 Determined on emulsion at outlet of reactor.
2 Determined on emulsion after 16 hours.

EXAMPLE 15

This example illustrates the use of the redox initiator potassium persulfate-sodium metabisulfite in the process of the present invention for the preparation of a vinyl acetate homopolymer emulsion. The apparatus and procedure were generally as described in Example 4. However, the temperature of polymerization was maintained at 60° C. Three feed reservoirs were utilized and the solutions added therefrom consisted of:

(1) 96.32% vinyl acetate containing dissolved therein 1.84% Pluronic L61 and 1.84% Pluronic F68 (percentages by weight of solution)
(2) 96.62% water containing 1.19% disodium hydrogen phosphate and 1.19% sodium metabisulfite (percentages by weight of solution), and
(3) 98.79% water containing 1.21% potassium persulfate (percentages by weight of solution).

The vinyl acetate solution was continuously added at a rate of 40 ml./min. and the other two solutions each at 16.5 ml./min.; an average residence time of 13.7 minutes was thus maintained. The polymerization proceeded without difficulty and the stable product emulsion contained 3.57% residual monomer by weight of emulsion at the reactor outlet. The emulsion polymerization was continued further but with substitution of trisodium phosphate for the disodium hydrogen phosphate to raise the pH to about 8. No change in residual monomer content of the product was noted. The polymerization temperature was then lowered to and maintained at 40° C. The residual monomer content of product emulsion from operation at this temperature was, however, about 25% by weight of the emulsion. The results thus indicated that at a temperature around 60° C. this redox system has the characteristics suitable for use with the procedure of the present invention to obtain rapid substantially complete polymerization of vinyl acetate, but at lower temperatures production of free radicals did not occur sufficiently rapidly to initiate substantially complete polymerization of vinyl acetate to monomer to polymer in an average polymerization period as short as 13.7 minutes; however, the redox system clearly was suitable for use in the process of the invention and permitted a desired degree of conversion of monomer to polymer to be obtained which could be varied by variation of temperature of polymerization and by duration of average residence time, i.e. time of repeated circulation in the reactor (which in turn depended on rate of feed of ingredients to the specific reactor).

EXAMPLES 16 AND 17

These examples illustrate the emulsion copolymerization of vinyl acetate and a commercial vinyl decanoate monomer, sold under the trademark "VV-10," in a proportion of 5.15% by weight of vinyl acetate. The apparatus and procedure used were substantially as described in Example 1, but the length of the tubular portion of the reactor consisted of one half inch (1 cm.) stainless steel tubing and gave the reactor an internal volume of 700 ml. The polymerization was carried out at 40° C. and the feed solutions consisted of:

(1) Vinyl acetate (93.16%) containing dissolved therein 1.61% of Pluronic L61, 4.80% of vinyl decanoate, and 0.43% tert.-butyl hydroperoxide (percentages by wt. of solution).

(2) Water (95.8%) containing 0.5% disodium hydrogen phosphate, 0.52% sodium bisulfite and 3.18% Puronic F68.

The feed rate of monomer solution was maintained at 47 ml./min. while that of the aqueous solution at 38 ml./min. for Example 16; thus the average residence time was 8.23 minutes. The same procedure was repeated with the rate of feed of monomer solution increased to 100 ml./min. and that of the aqueous solution to 84 ml./min. for Example 17; thus an average residence time was maintained at 3.80 minutes. In both cases polymerization proceeded smoothly and stable emulsions were produced, no problems in operation being encountered even at the shorter of the two average residence times. The properties of the products are shown in Table 4.

EXAMPLE 19

This example illustrates the emulsion interpolymerization, according to the present invention, of a mixture of four monomers, vinyl acetate, vinyl chloride, acrylic acid, and acrylamide in the proportions 100:10.7:1.22:0.64. The apparatus and procedure were substantially as described for Examples 16 and 17, using a polymerization temperature of 40° C. and atmospheric pressure. However, three separate feed solutions were utilized as follows:

(1) Vinyl acetate (89.92%) containing dissolved therein vinyl chloride (9.63%) and tert.-butyl hydroperoxide (0.45%), percentages by weight of solution.

(2) Water (95.88%) containing acrylic acid (1.63%), acrylamide (0.86%), and a surfactant, Gafac RE-610 (trademark) (1.63%), percentages by weight of the solution, the solution being neutralized to pH 7 with sodium hydroxide. (Gafac is a polyethyleneoxy phosphate ester).

(3) Water (96.7%) containing sodium bisulfite (3.3%), percentages by weight of solution.

The feed rates were continuously maintained at 32 ml./min., 20 ml./min., and 6 ml./min. respectively for the three solutions; the average residence time thus was 12.07 minutes. Polymerization proceeded smoothly as in the preceding example, to substantially complete conversion of the monomers. The product was a stable interpolymer emulsion of 54.6% total solids by weight of

TABLE 4

| Ex. No. | Average residence time (min.) | Product emulsion ||||||
|---|---|---|---|---|---|---|---|
| | | Total solids (percent) | pH | Viscosity (poises) | Average particle size (micron) | Residual monomer (Percent by weight of emulsion) ||
| | | | | | | (1) | (2) |
| 16 | 8.23 | 54.3 | 6.0 | 0.68 | 0.34 | 1.30 | 0.42 |
| 17 | 3.80 | 53.3 | 6.0 | 0.45 | 0.32 | 1.10 | 0.65 |

1 Determined on emulsion at outlet of reactor.
2 Determined on emulsion after 16 hours.

EXAMPLE 18

This example illustrates the emulsion copolymerization of vinyl acetate and vinyl chloride, in a weight ratio of 5:1, carried out according to the present invention at 40° C. and at atmospheric pressure. The procedure and apparatus were as described for Examples 16 and 17; however, vinyl chloride was included in the monomer by being dissolved in vinyl acetate, the vinyl acetate being kept saturated at room temperature with vinyl chloride. The actual compositions of the feed solutions were as follows:

(1) 1.54% Pluronic L61, 1.54% Pluronic F68, 0.34% tert.-butyl hydroperoxide, 16.12% vinyl chloride, 80.46% vinyl acetate and, (2) 0.6% disodium hydrogen phosphate, 0.6% sodium bisulfite, 98.8% water.

The monomer solution was added continuously to the centrifugal pump at a rate of 40 ml./min. and the aqueous solution at a rate of 33 ml./min.; thus, the average residence time was 10.96 minutes. The vinyl acetate feed solution was kept saturated with vinyl chloride at room temperature and atmospheric pressure. Although the polymerization was carried out at 40° C. and atmospheric pressure, there was neither foaming of the polymerization mixture nor detectable vinyl chloride monomer at the reactor outlet, thereby indicating no vaporization of vinyl chloride in the reactor and further indicating the rapidity of the polymerization reaction, which proceeded to substantially complete conversion of the monomers. The product was a stable vinyl acetate-vinyl chloride copolymer emulsion of 53.2% total solids by weight of emulsion, having pH 6.7, viscosity 0.25 poise and average particle size 0.5 micron. The polymer formed was shown to be a copolymer of vinyl acetate and vinyl chloride by its complete solubility in methanol; vinyl chloride homopolymer is insoluble in methanol.

emulsion, pH 6.1, viscosity 0.25 poise, average particle size 0.45 micron, residual monomer at reactor outlet of 3.03% by weight of emulsion decreasing to 0.32% on standing for 16 hours.

EXAMPLE 20

This example illustrates an embodiment of the invention in which a continuous polymerization process is used to prepare a copolymer emulsion. The process was carried out in a continuous polymerization apparatus which included a centrifugal type circulating pump arranged to circulate polymerizing mixture through a substantially closed loop circuit in indirect heat exchange relationship with a suitable cooling medium. The pump was driven at 1755 r.p.m. and was rated to deliver 92.5 imperial gallons of water per minute at a discharge pressure of 20 p.s.i. (419 liters/min. at 1.4 kg./cm.² pressure). The loop circuit consisted essentially of 40 feet (12.2 meters) of two inch (5 cm.) nominal diameter stainless steel piping, coiled for convenience and immersed under a water spray which was varied to regulate the temperature of the coiled piping. Ingredients for the copolymer emulsion were fed continuously at uniform rates to the inlet of the pump for circulation with the polymerizing mixture through the loop which returned most of the mixture to the inlet of the pump; a small proportion of the flow in the loop was continuously withdrawn therefrom at a point near the return to the pump inlet, the polymerizing mixture in the loop near the pump inlet being nearly completely polymerized. The weight rate of continuous withdrawal from the loop was equal to the weight rate of continuous feed of ingredients, thus maintaining a constant volume of polymerizing mixture circulating in the loop. The relative rates of flow of polymerizing mixture in the loop and of continuous withdrawal were estimated roughly to be in the range from about 50:1 to about 100:1. The volume of polymerizing mixture in the pump and loop at any instant during polymerization was about 5.5 imperial gallons (25 liters), and the total rate of feed of ingredients 26 imperial gallons (118 liters) per hour, thus the hold-up time or average residence time of the reacting mixture in the polymerization apparatus was about 12.7 minutes. Two feed solutions were prepared as follows:

(1) Acrylamide was dissolved in a mixture of methanol and vinyl acetate, together with a small proportion of tert.-butyl hydroperoxide (70% active ingredient) to give a monomer solution of 87.76% vinyl acetate, 4.71% methanol, 7.12% acrylamide, and 0.41% tert.-butyl hydroperoxide; (2) sodium bisulfite and disodium hydrogen phosphate were dissolved in water to give an aqueous buffer solution of 0.54% NaHSO₃, 0.54% Na₂HPO₄ and 98.92% water. The polymerization apparatus was initially filled with water, the circulating pump was started to circulate the emulsion through the loop, then uniform rate feed of the monomer and aqueous buffer solutions at 15 and 11 imperial gallons per hour (68.2 and 50 liters per hour) respectively to the inlet of the circulating pump was started using two metering pumps to feed these solutions to the circulating pump. When feed of the monomer and buffer solutions was started the temperature of the emulsion circulating in the loop began to rise from ambient room temperature and was allowed to rise to 40° C. at which value it was maintained by regulation of the cooling water spray on the loop. The product emulsion withdrawn from the loop was accumulated in a storage vessel and periodically samples of the emulsion coming from the loop were taken for determination of the emulsion properties. Under the steady state conditions of reactant feed, polymerization, and product withdrawal which were rapidly achieved, the product emulsion was found to be a stable copolymer emulsion containing 54.8% total solids by weight of the emulsion; it had a pH of 5.6, a viscosity of 3.7 poise at 20° C., and a residual vinyl acetate monomer content, immediately after withdrawal from the loop, of slightly less than 0.3% by weight of the emulsion. The residual vinyl acetate content of the emulsion decreased on standing one day to 0.14%, indicating the continuance of polymerization at least to some extent after withdrawal of the emulsion from the loop. The copolymer in the emulsion was found to be a random vinyl acetate-acrylamide copolymer, completely soluble in a 3:1 w./w. acetone-water mixture, and to contain 7.5% of acrylamide by weight of the copolymer.

EXAMPLE 21

This example illustrates an embodiment of the invention in which a continuous polymerization of vinyl chloride dispersed in aqueous medium under pressure was carried out. The apparatus for conducting the polymerization comprised elements similar to the apparatus described in Example 1, but modified to maintain polymerization under pressure and vent the equipment to nitrogen. The centrifugal pump casing was fabricated and assembled to withstand internal pressures up to 65 atmospheres. The elongated reactor comprised a length of one-half inch (1 cm.) outside diameter stainless steel pressure tubing, encased through part of its length in heat-exchange tubing through which cooling water could be circulated. The volume of charge that could be held by the pump and reactor tubing was 500 ml. A storage vessel holding vinyl chloride under pressure was connected to permit continuous feed of liquid vinyl chloride through a feed pump into the inlet of the centrifugal circulating pump. A second feed pump was arranged to pump an aqueous solution continuously into the centrifugal pump inlet simultaneously. An overflow line from the reactor tubing was connected to a pressure receiver to collect liquid overflow from the reactor under pressure, and the various parts of the apparatus were vented through a pressure relief valve which was set to maintain the system under a pressure of 20.4 atmospheres gage pressure (300 p.s.i.g.). Vinyl chloride containing 0.10% of its weight of tert.-butyl hydroperoxide dissolved therein was fed from the storage vessel to the centrifugal pump inlet at a uniform rate of 15 ml./min., the monomer feed rate thus being 13.8 g./min. vinyl chloride and 13.8 mg./min. tert.-butyl hydroperoxide. An aqueous solution containing 3.20 g. sodium bisulfite, 3.50 g. disodium hydrogen phosphate, and 100 g. sodium dihexyl sulfosuccinate surfactant dissolved in 2000 ml. water was fed simultaneously to the centrifugal pump at a uniform rate of 12.38 ml./min., the materials all being fed at room temperature. The average residence time of the charge in the circulating pump and reactor circuit thus was about 18.3 minutes. The circulation ratio for the charge, based on the measured pumping capacity of the circulating pump using water and the measured viscosity of reaction products, was estimated to be between 200:1 and 250:1. The circulating pump and reactor tube were initially filled with water, then feed of the foregoing solutions by means of the feed pumps was started and continued at the indicated uniform rates for over two hours. Temperature of the circulating charge was maintained at 35° C. by means of water circulated in the heat exchange tubing. The accumulated product collected in the pressure receiver from the reactor overflow was found to be an emulsion of fine polyvinyl chloride in an amount indicating conversion of over 97% of the monomeric vinyl chloride to polyvinyl chloride. The emulsion had a pH of 3.0 and a viscosity of 0.20 poise as measured at 23° C. with a Brookfield viscometer using the No. 1 spindle turning at 20 r.p.m.; the range of sizes of the polyvinyl chloride particles in the emulsion as observed with an electron microscope was from 0.03 to 0.20 micron. The polymer was readily separable from the emulsion by processes such as spray drying, and the separated polymer was found to have an intrinsic viscosity, as measured at 30° C. with a 0.1% solution in cyclohexanone, of 1.28 dl./g., indicating it to be a high molecular weight polymer.

EXAMPLE 22

This example was carried out in the apparatus described in Example 20 and illustrates the preparation of a copolymer latex particularly useful as a base for latex paints having high pigment volume concentrations for use on acoustic ceiling tile. The vinyl monomers used were vinyl acetate and commercial vinyl decanoate sold under the trademark "VV-10." The general procedure followed in this example was that used in Example 20 above. The two feed solutions which were fed continuously to the copolymerization reaction were:

(1) Vinyl acetate (91.05%) containing dissolved Pluronic L61 (2.76%), Pluronic F68 (1.80%), vinyl decanoate (3.91%), and tert. - butyl hydroperoxide (0.47%), percentages by weight of the solution, and (2) Water (98.78%) containing dissolved disodium hydrogen phosphate and sodium bisulfite (0.61% of each), percentages by weight of solution. The apparatus was initially filled with water then feed of the foregoing solutions was started; the vinyl acetate solution was added uniformly at a rate of 25 imperial gallons (113 liters) per hour and the aqueous solution at a rate of 20 imperial gallons (91 liters) per hour, giving an average residence time for the ingredients in the reactor of 7.3 minutes. When steady state conditions of temperature (40° C.), feed, and uniform emulsion product withdrawal had been achieved the product was found to be a smooth, creamy stable emulsion of vinyl acetatevinyl decanoate copolymer containing 57.4% solids by weight of the emulsion; it has a pH of 6.6, a viscosity of 0.5 poise measured as described in Example 1, and an average particle size of 0.3 micron. The residual monomer in the emulsion at the outlet of the reactor was 0.4%, indicating a monomer conversion of over 99%. The production of emulsion at the rate of 45 imperial gallons (204 liters) per hour was continued for seven hours and the accumulated product was allowed to stand at ambient room temperaturefor a day, during which its residual monomer content was found to decrease to 0.05%. A sample of the emulsion prepared in this example was compounded with a standard pigment for formulation to form a latex paint with a pigment volume concentration (PVC) of 83.5%; such a paint has an exceptionally high PVC and is used primarily for application to acoustic ceiling tile. The scrub resistance of the paint, as measured by a standard test in which a film of the paint is scrubbed to destruction, was found to be 220 cycles. A sample of paint of the same formulation was prepared from a commercial emulsion of vinyl acetate-vinyl decanoate copolymer having exactly the same proportions of ingredients as the emulsion prepared in the present example, but prepared in a standard batch commercial emulsion copolymerization. The paint made from the emulsion prepared by the batch process was found to have a scrub resistance of only 20 cycles.

The foregoing remarkable difference in properties of the emulsion, viz: pigment binding power, as indicated by scrub resistance, is entirely unexpected and could not have been predicted to occur as a result of preparing an emulsion by a continuous polymerization process instead of by a batch process.

Other remarkable differences in properties have been noted between products prepared by an emulsion polymerization process in accordance with the present invention and products prepared with the same ingredients but using a conventional delayed addition batch polymerization process. For example the vinyl acetate homopolymer formed in some of the emulsion polymerizations in accordance with the present invention are found to be completely soluble in 3:1 mixtures (wt./wt.) of acetone and water, whereas the vinyl acetate homopolymers in emulsions made from the same ingredients by a conventional batch polymerization process are soluble in a 3:1 (wt./wt.) acetone: water mixture only to a very limited extent, e.g. around 40%, the remainder of the polymer being insoluble in such a mixture. Although the reasons for these differences in properties of products have not been ascertained, the unexpected differences themselves are an indication that there are significant and unexpected results achieved by the process of the present invention.

EXAMPLE 23

This example illustrates an embodiment of the invention in which the continuous polymerization of vinyl chloride was carried out in a non-aqueous medium in which polyvinyl chloride is insoluble. The polymerization reactor apparatus comprised a length of 14.5 feet (4.4 meters) of one half inch (1 cm.) outside diameter stainless steel pressure tubing, encased through six feet (2 meters) of its length in heat exchange tubing through which heating or cooling water could be circulated; the tubing was connected to form a loop between the outlet and inlet of a "Moyno" (trademark) continuous flow positive displacement circulating pump driven at a speed of about 900 r.p.m. The volume of the charge that was contained in the pump and reactor tubing was 2000 ml. The pumping capacity of the positive displacement circulating pump under the conditions of the example was about 4.4 imperial gallons per minute (20 liters/min.). Thus the charge in the reactor was being circulated once through the pump and elongated reactor in each 6 seconds. The pump and tubing were connected by small pressure lines to three feed inlets, and through a liquid overflow line to a pressure relief valve and a pair of alternate pressure accumulator vessels arranged in parallel. The pump and reactor were filled initially with a charge of 700 ml. benzene, 700 ml. methanol, and 600 ml. vinyl chloride under pressure, and circulation of the charge through the reactor under pressure was started. Temperature of the charge was brought to 55° C. and slow continuous addition to the charge of three feed streams under pressure was started. The first stream was methanol and was fed to the circulating charge at the inlet of the circulating pump at a rate of 5 ml./min.; the second stream was benzene cooled to 10° C. and containing acetyl cyclohexyl sulfonyl peroxide (ACSP) polymerization initiator dissolved therein, and was fed to the circulating charge also at the inlet of the circulating pump at a rate of 5 ml./min., the proportion of initiator being 0.3% by weight of the third stream which was liquid vinyl chloride fed to the circulating charge at the outlet of the circulating pump at a rate of 5 ml./min. Temperature of the circulating charge was maintained in the range 55–60° C., and liquid charge overflowing through the liquid overflow line was accumulated in the accumulators as the liquid streams were fed to the charge. Uniform pumping of the feed solutions and the circulating charge was maintained over a period of two and one-half hours during which charge overflowing from the liquid overflow was collected in the pressure accumulators for subsequent recovery of the polymer therein. During the last two hours of the foregoing period polymerization of part of the vinyl chloride in the reactor took place under approximately equilibrium conditions and the polymer formed precipitated as a fine powder insoluble in the circulating charge and accumulated as a suspension of solids which settled readily in the liquid polymerization medium that overflowed into the accumulators. Accumulated suspension of polymer in polymerizing medium was drained periodically from an isolated accumulator through a discharge valve to a container at atmospheric pressure. Unpolymerized vinyl chloride in the liquid at atmospheric pressure volatilized rapidly, exerting a cooling effect on the suspension. At the end of the run the accumulated suspension was filtered to separate the solid polyvinyl chloride from the liquid medium. The recovered solid polyvinyl chloride weighed 70 grams and was completely soluble in tetrahydrofurane in which it was dissolved and from which it was reprecipitated by dilution with methanol. The reprecipitated polymer had an intrinsic viscosity of 0.35 dl./gm. indicating that it was a low molecular weight polyvinyl chloride resin of the type suitable for use in preparation of polyvinyl chloride coatings and as an impact modifier in polyvinyl chloride extrusions.

EXAMPLE 24

This example was carried out in the same apparatus described in the preceding Example 23. In the present example, vinyl chloride was polymerized to polyvinyl chloride in a bulk polymerization, the polymer formed being insoluble in monomeric liquid vinyl chloride and therefore precipitating as a fine solid in suspension in the liquid vinyl chloride medium. Initially the circulating pump and elongated reactor tube were filled with a charge of 2000 ml. of monomeric vinyl chloride, and the charge circulated while its temperature was raised to 55° C. When the charge reached this temperature a continuous feed to the inlet of the circulating pump of liquid vinyl chloride containing 12 gm. of ACSP polymerization initiator dissolved in 480 gm. of vinyl chloride was started at a uniform rate of 2 ml. per minute; prior to being pumped into the circulating charge the feed solution was maintained at 10° C. to preclude premature polymerization. Under the effect of the temperature in the circulating charge (which was maintained in the range 55–60° C.) in the presence of the initiator, some of the vinyl chloride polymerized to form a suspension of solid polyvinyl chloride in liquid vinyl chloride which suspension overflowed continuously into the pressure accumulators as fresh feed was pumped into the reactor. After 55 minutes of feeding of monomer containing initiator, a leaking gland in the circulating pump forced a shut-down of the apparatus: the suspension of solid vinyl chloride polymer in vinyl chloride monomer accumulated during the operation was recovered from the apparatus and the monomer was evaporated from the polymer. The yield of polyvinyl chloride was 10 grams and the polymer had an intrinsic viscosity of 0.70 dl./gm. indicating that it was a low molecular weight polyvinyl chloride resin suitable for use in blow moldings and rigid monofilament extrusions.

The last two of the foregoing examples have illustrated that the continuous polymerizaiton of polymerizable vinyl monomer in accordance with the process of the invention can be carried out broadly in any liquid media in which the resultant polymer is insoluble, including aqueous media, in which most vinyl monomers generally are immiscible, and organic liquid media, in which vinyl monomers generally are miscible; suitable as a liquid polymerization medium also is the vinyl monomer itself when its polymer is insoluble in the monomer.

While all the foregoing examples have illustrated the polymerization and copolymerization of a limited number of vinyl monomers, it must be understood that the process of the invention is suitable for vinyl polymerizations and copolymerizations in general, including for example polymerization of acrylic and methacrylic esters (e.g. ethyl acrylate, butyl acrylate, glycidyl acrylate, methyl methacrylate), polymerization of vinyl aromatic compounds (e.g. styrene and styrene-butadiene copolymerization), polymerization of vinylidene compounds (e.g. vinylidene chloride), and polymerization of vinyl cyanide (acrylonitrile).

Numerous other variations and modifications of the specific expedients described may be made without departing from the present invention, the scope of which is defined in the following claims.

Wha is claimed is:

1. A continuous process for the polymerization of polymerizable vinyl monomer in liquid media in which the resulting polymer is insoluble which process comprises:
   (a) continuously repeatedly circulating a charge of a polymerizing vinyl monomer, liquid medium in which the resultant polymer is insoluble, through a circulating pump and an elongated reactor,
   (b) continuously adding to the charge as ingredients thereof
       (i) vinyl monomer in the liquid phase,
       (ii) liquid medium in which the vinyl monomer is to be polymerized, and
       (iii) a polymerization initiator system which at the temperature in the reactor and within the time required for the charge to circulate once through the reactor, decomposes substantially quantitatively and forms at least a polymerization initiating quantity of free radicals,
   (c) maintaining the circulating charge in a suitable polymerization temperature range, and
   (d) continuously withdrawing part of the circulating charge from the reactor at a rate equal to the rate of addition of ingredients, the rate of circulating the charge and the rate of addition of the monomer to be polymerized and the liquid medium being proportioned to achieve a desired degree of conversion of the monomer to polymer.

2. A continuous process as claimed in claim 1, in which the liquid medium is an aqueous medium, the rate of circulating the charge is a multiple of at least ten times the rate of addition of the monomer and aqueous medium, and the said ratese of addition are proportioned to provide a desired ratio of polymer to dispersing medium in the withdrawn product and to expel polymerizing charge containing less than 5% of vinyl monomer.

3. A process as claimed in claim 2 in which the multiple is at least twenty-five.

4. A process as claimed in claim 3 in which the polymerization initiator system is a redox polymerization initiator system consisting of an organic hydroperoxide dissolved in the vinyl monomer being added to the charge and a reducing agent of the group sodium bisulfite and sodium metabisulfite dissolved in the aqueous medium being added to the charge.

5. A process as claimed in claim 4 in which the organic hydroperoxide is tertiary butyl hydroperoxide.

6. A process as claimed in claim 3 in which the polymerization initiator system is a redox polymerization initiator system consisting of a water soluble persulfate salt dissolved in part of the aqueous medium being added to the charge and a reducing agent of the group sodium bisulfite and sodium metabisulfite dissolved in a separate part of the aqueous medium being added to the charge.

7. A process as claimed in claim 1 in which the vinyl monomer comprises a vinyl acetate.

8. A process as claimed in claim 7 in which the vinyl monomer additionally includes vinyl monomers copolymerizable with vinyl acetate.

9. A process as claimed in claim 1 in which the vinyl monomer comprises vinyl chloride.

10. A process as claimed in claim 1 in which the polymerization is carried out under pressure greater than atmospheric.

11. In a continuous process for the polymerization of polymerizable vinyl monomer in liquid medium in which the resulting polymer is insoluble in polymerization apparatus comprising a circulating pump and an elongated reactor by:
    (a) continuously adding to the polymerization apparatus as ingredients to form a polymerization charge:
        (i) vinyl monomer in the liquid phase
        (ii) liquid medium in which the vinyl monomer is to be polymerized, and
        (iii) a polymerization initiator system,
    (b) maintaining the charge in a suitable polymerization temperature range, and
    (c) continuously withdrawing a part of the charge from the reactor at a rate equal to the rate of addition of ingredients to the charge,
the improvement which comprises, while continuously adding to and withdrawing from the charge, continuously repeatedly recirculating the charge through the polymerization apparatus at a rate such that, within the time required for the charge to circulate once through the apparatus, polymerization initiator system added to the charge decomposes substantially quantitatively and forms at least a polymerization initiating quantiy of free radicals, the rate of circulation of the charge and the rates of addition of the monomer and liquid medium being proportioned to achieve a desired degree of conversion of monomer to polymer.

12. A process as claimed in claim 1, in which the liquid medium is an organic medium.

13. A process as claimed in claim 12 in which the organic medium is the same substance as the vinyl monomer being polymerized.

References Cited
UNITED STATES PATENTS 3,458,467  7/1969  Herrle et al. _____ 260—29.6

JOSEPH L. SCHOFER, Primary Examiner

J. KIGHT, Assistant Examiner

U.S. Cl. X.R.

260—80, 80.73, 80.8, 80.81, 83.7, 85.5, 86.1, 86.3, 87.1, 87.3, 88.2, 88.7, 89.1, 89.5, 92.8, 93.5, 95